Oct. 4, 1938.  C. D. BURRELL  2,131,869
SHEET GLASS HANDLING APPARATUS
Filed April 16, 1937  2 Sheets-Sheet 1

Inventor
CHARLES D. BURRELL
By Frank Fraser
Attorney

Oct. 4, 1938. C. D. BURRELL 2,131,869
SHEET GLASS HANDLING APPARATUS
Filed April 16, 1937   2 Sheets-Sheet 2
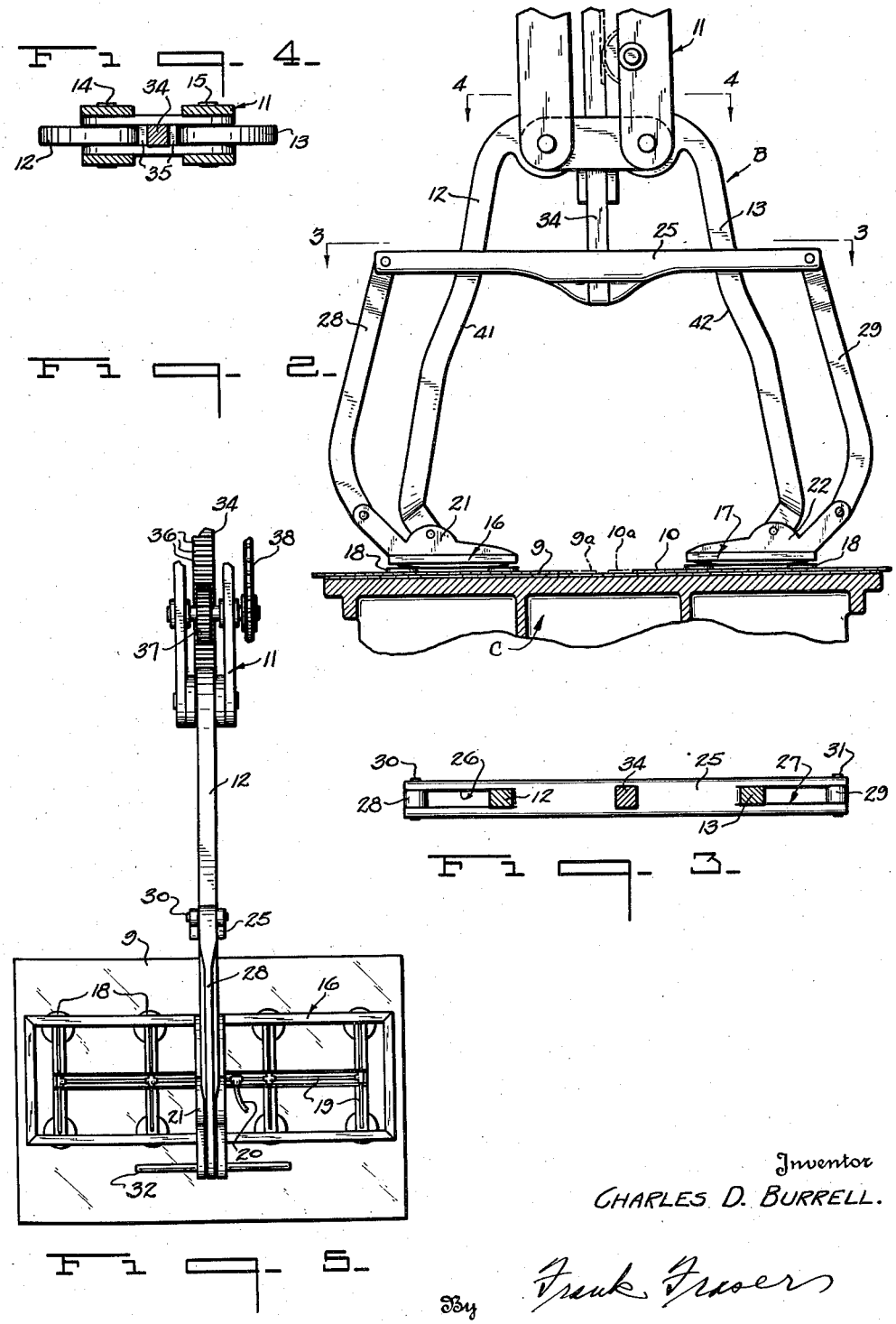
Inventor
CHARLES D. BURRELL.
By Frank Fraser
Attorney Patented Oct. 4, 1938

2,131,869

UNITED STATES PATENT OFFICE 2,131,869

SHEET GLASS HANDLING APPARATUS

Charles D. Burrell, Toledo, Ohio, assignor to Libbey-Owens-Ford Glass Company, Toledo, Ohio, a corporation of Ohio Application April 16, 1937, Serial No. 137,287

7 Claims. (Cl. 294—65)

The present invention relates to improvements in sheet glass handling apparatus.

While the apparatus of this invention is not limited to any specific use, it has been primarily designed for and is of especial utility when employed for transferring sheets of glass from a buck or the like to the work cars or tables of a suitable surfacing apparatus such as those employed for conveying the sheets successively beneath a series of grinding and polishing machines in the continuous system of surfacing sheet glass. These sheets of glass are commonly termed "plate glass blanks" and are ordinarily secured to the work cars or tables by means of a layer of plaster of Paris or the like.

The aim of the invention is the provision of novel handling apparatus for simultaneously picking up two sheets of glass from opposite sides of a buck, upon which they are supported in a substantially vertical position, swinging the sheets to a horizontal position and laying them side by side upon the top of the work car or table, thereby greatly facilitating and expediting the transfer of the plate glass blanks from the former to the latter.

Although the invention will be particularly described for transferring the glass sheets from the buck to the work car or table, it will be appreciated that the handling apparatus here provided is equally useful in picking up the glass sheets from the car or table after surfacing and placing them upon the buck.

Other objects and advantages of the invention will become more apparent during the course of the following description when taken in connection with the accompanying drawings.

In the drawings wherein like numerals are employed to designate like parts throughout the same, Fig. 1 is an elevation of sheet glass handling apparatus constructed in accordance with the present invention showing the manner in which the glass sheets are taken from the buck;

Fig. 2 is a substantially similar view showing the laying of glass sheets horizontally upon the work table;

Fig. 3 is a horizontal section taken substantially on line 3—3 of Fig. 2;

Fig. 4 is a horizontal section taken substantially on line 4—4 of Fig. 2; and

Fig. 5 is a view of the apparatus taken at right angles to Fig. 1.

Figure 1:
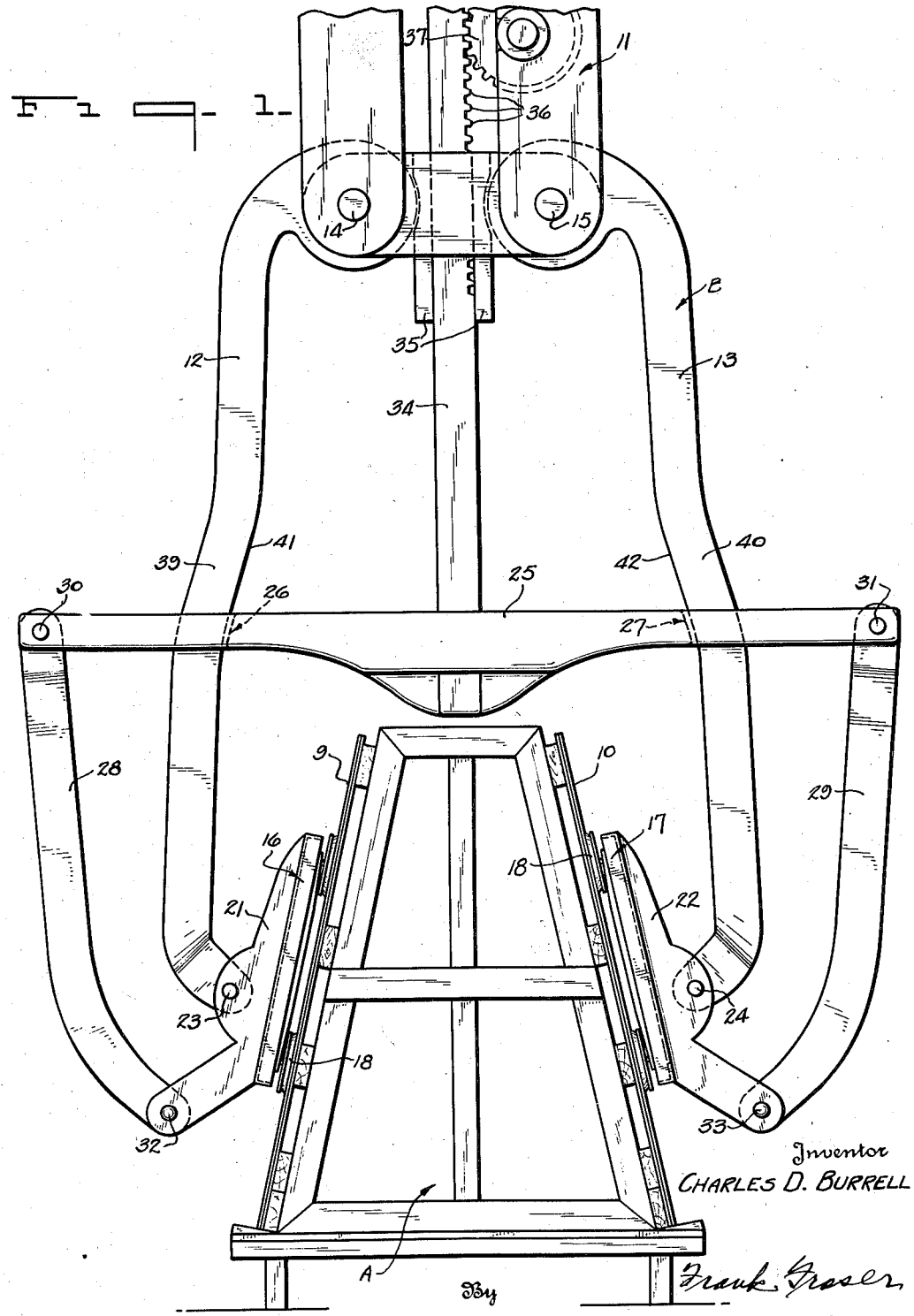

With reference now to the drawings, A designates in its entirety a glass buck of any conventional or preferred construction upon the opposite sides of which glass sheets 9 and 10 are supported on edge in a substantially vertical position, and B the improved handling apparatus here provided for taking the glass sheets 9 and 10 from the buck and laying them horizontally upon the upper surface of the work car or table C (Fig. 2). The invention is of course not limited to any particular type of buck nor to the particular construction of the work car or table. Moreover, the handling apparatus is not limited to the specific uses herein described and may also be employed in handling sheets or plates of materials other than glass.

The sheet glass handling apparatus B comprises a supporting means 11 which is adapted to be associated in any desired manner with an overhead crane, not shown, whereby the handling apparatus can be moved to any desired point as well as raised and lowered. Carried by the supporting means 11 are the two substantially vertical lever arms 12 and 13 pivoted at their upper ends to the supporting means 11 as at 14 and 15 respectively. Associated with the lower ends of the lever arms 12 and 13 are the vacuum frames 16 and 17 respectively, each frame being preferably substantially rectangular as shown in Fig. 5 and carrying a plurality of sheet holding members 18 preferably in the form of suction devices or cups. Communicating with the interior of each suction cup 18 is a vacuum or suction tube 19 which may all be conveniently connected with a conduit 20 having connection with a suitable suction creating device (not shown).

When the vacuum frames 16 and 17 are moved to a substantially vertical position, they will face one another as shown in Fig. 1 and are provided upon the backs thereof, intermediate their ends, with bracket members 21 and 22 having a pivotal mounting intermediate their ends with the lever arms 12 and 13 as at 23 and 24 respectively.

Associated with the lever arms 12 and 13 intermediate their ends is a horizontal cross bar 25 provided with slots 26 and 27 at its opposite ends through which the said lever arms are loosely received. Carried at the opposite ends of the cross bar are the depending link members 28 and 29 pivoted at their upper ends to said cross bar at 30 and 31 respectively and at their lower ends to the bracket members 21 and 22 by means of the rods 32 and 33 respectively which also constitute handles adapted to be grasped by the operators in properly positioning the vacuum frames during handling of the glass sheets. The link members 28 and 29 are disposed outwardly of the lever arms 12 and 13 and it will be noted that the pivotal points 32 and 33 of the link members with the vacuum frames are arranged beneath and outwardly of the pivotal points 23 and 24 of the lever arms with said vacuum frames.

The cross bar 25 is carried by a vertical rack bar 34 which passes upwardly between the lever arms 12 and 13 and is guided for vertical sliding movement by the spaced guide plates 35 secured to the supporting means 11. The rack bar 34 is formed adjacent its upper end with a series of rack teeth 36 with which meshes a spur gear 37 rotatably carried by the supporting means 11 and driven from any suitable source of power through a chain and sprocket drive or the like 38 (Fig. 5).

When it is desired to transfer a pair of glass sheets 9 and 10 from the buck A to the work table C, the handling apparatus B is first brought to a position over the buck and the horizontal bar 25 lowered by rotating the gear 37 in a counter-clockwise direction, thereby effecting swinging of the vacuum frames to a substantially vertical position. The apparatus is then lowered and one or more operators, by grasping hold of the handles 32 and 33, can move the vacuum frames away from one another so that they can be slipped over the buck and properly positioned with respect to the glass sheets on opposite sides of the buck. The suction means is then operated to create a suction within the suction devices 18 so as to firmly attach the glass sheets thereto. After the desired vacuum has been set up, the entire apparatus is raised to lift the glass sheets from the buck, and substantially simultaneous with the raising of the entire apparatus, the gear 38 is rotated in a clockwise direction to raise the cross bar 25, thereby effecting swinging movement of the vacuum frames 16 and 17 and glass sheets carried thereby to a horizontal position, the said vacuum frames pivoting about the pivotal points 23 and 24. The upward movement of the cross bar 25 is also adapted to cause the lever arms 12 and 13 to move away from one another so that the glass sheets can be swung to horizontal position without any danger of them engaging or interfering with one another.

In order to effect this movement of the lever arms 12 and 13 away from one another, the said arms are provided, intermediate their ends, with the upwardly converging portions 39 and 40, the inner faces 41 and 42 of which constitute cam faces which are engageable by the inner end walls of the slots 26 and 27 upon upward movement of the cross bar 25.

From the above, it will be seen that upon upward movement of the cross bar 25, the lever arms 12 and 13 will be moved outwardly, and because the pivot points 32 and 33 of the link members are outwardly of the pivotal points 23 and 24 of the lever arms, the vacuum frames will be simultaneously swung to a horizontal position as shown in Fig. 2. When in such position, the glass sheets can be laid horizontally upon the top of the table C, after which the suction within the suction devices 18 is released so that the handling apparatus can be removed. When the glass sheets are laid side by side upon the table, the adjacent edges thereof are spaced relatively far apart as shown by the full lines in Fig. 2, and after the handling apparatus has been removed, the said sheets can be shoved closer together if desired, as indicated by the broken lines 9a and 10a.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Sheet glass handling apparatus comprising in combination, supporting means, a pair of substantially vertical lever arms carried at their upper ends by said supporting means, a vacuum frame pivoted to the lower end of each lever arm and being provided with sheet holding means, and means slidably associated with said lever arms and having operative connections with said vacuum frame for swinging the said vacuum frames to a substantially horizontal position upon upward movement thereof relative to the said lever arms.

2. Sheet glass handling apparatus comprising in combination, supporting means, a pair of substantially vertical lever arms carried at their upper ends by said supporting means, a vacuum frame pivoted to the lower end of each lever arm and being provided with sheet holding means, and a substantially horizontal actuating member associated with said lever arms for vertical sliding movement and having operative connections with said vacuum frames for swinging the said vacuum frames to a substantially horizontal position upon upward movement thereof relative to the said lever arms, the vacuum frames automatically assuming a substantially vertical position upon lowering of said actuating means.

3. Sheet glass handling apparatus comprising in combination, supporting means, a pair of substantially vertical lever arms pivoted at their upper ends to said supporting means for movement toward and away from one another, a vacuum frame pivoted to the lower end of each lever arm and being provided with sheet holding means, and means slidably associated with said lever arms and having operative connections with said vacuum frames for moving the lever arms away from one another and simultaneously swinging the said vacuum frames to a substantially horizontal position upon upward movement thereof relative to the said lever arms.

4. Sheet glass handling apparatus comprising in combination, supporting means, a pair of substantially vertical lever arms pivoted at their upper ends to said supporting means for movement toward and away from one another, a vacuum frame pivoted to the lower end of each lever arm and being provided with sheet holding means, and a substantially horizontal actuating member associated with said lever arms for vertical sliding movement and having operative connections with said vacuum frames for swinging the said vacuum frames to a substantially horizontal position upon upward movement thereof relative to the said lever arms, said lever arms being provided with portions engageable by the actuating means for moving the lever arms away from one another simultaneous with the swinging of the vacuum frames to substantially horizontal position.

5. Sheet glass handling apparatus comprising in combination, supporting means, a pair of substantially vertical lever arms pivoted at their upper ends to said supporting means for movement toward and away from one another, a substantially horizontal cross bar associated with said lever arms, a pair of substantially vertical link members pivoted at their upper ends to said cross bar and disposed outwardly of said lever arms, a vacuum frame pivoted to each lever arm and respective link member and provided with sheet holding means, with the said vacuum frames facing one another when in a substantially vertical position, and means for moving said cross bar vertically relative to the said lever arms to effect inward or outward movement thereof and to simultaneously lower or raise the link members to effect swinging of the vacuum frames to either a substantially vertical position or a substantially horizontal position.

6. Sheet glass handling apparatus comprising in combination, supporting means, a pair of substantially vertical lever arms pivoted at their upper ends to said supporting means for movement toward and away from one another, a substantially horizontal cross bar associated with said lever arms for vertical sliding movement, a pair of substantially vertical link members pivoted at their upper ends to said cross bar and disposed outwardly of said lever arms, a vacuum frame pivoted to each lever arm and respective link member and provided with sheet holding devices, with the said vacuum frames facing one another when in a substantially vertical position, and means for moving said cross bar vertically relative to the said lever arms, said lever arms being provided with cam surfaces engageable by said cross bar upon upward movement of the latter to move the lever arms away from one another and simultaneously effect the swinging of the vacuum frames to a substantially horizontal position, the lever arms automatically moving toward one another and the vacuum frames to a substantially vertical position upon lowering of the cross member.

7. Sheet glass handling apparatus comprising in combination, supporting means, a pair of substantially vertical lever arms pivoted at their upper ends to said supporting means for movement toward and away from one another, a substantially horizontal cross bar associated with said lever arms and having slots therein through which the said lever arms are freely received, a pair of substantially vertical link members pivoted at their upper ends to said cross bar and disposed outwardly of said lever arms, a vacuum frame pivoted to each lever arm and respective link member and provided with sheet holding means, said lever arms being provided with cam surfaces and the pivotal points of the vacuum frames with the link members being disposed beneath and outwardly of the pivotal points of said vacuum frames with said lever arms, and means for moving said cross bar upwardly relative to said lever arms whereby the end walls of the slots in the cross bar engaging the cam surfaces on said lever arms will move the lever arms away from one another while the vertical movement of the link members will simultaneously swing the vacuum frames to a substantially horizontal position.

CHARLES D. BURRELL.